United States Patent
Jiang et al.

(10) Patent No.: US 12,191,517 B2
(45) Date of Patent: Jan. 7, 2025

(54) BATTERY BOX

(71) Applicant: CONTEMPORARY AMPEREX TECHNOLOGY (HONG KONG) LIMITED, Hong Kong (CN)

(72) Inventors: Liwen Jiang, Fujian (CN); Wumei Fang, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 771 days.

(21) Appl. No.: 17/355,712

(22) Filed: Jun. 23, 2021

(65) Prior Publication Data
US 2021/0320372 A1    Oct. 14, 2021

Related U.S. Application Data

(63) Continuation of application No. PCT/CN2019/079676, filed on Mar. 26, 2019.

(30) Foreign Application Priority Data

Dec. 27, 2018 (CN) .......................... 201822224327.3

(51) Int. Cl.
*H01M 50/289* (2021.01)
*H01M 10/42* (2006.01)
(Continued)

(52) U.S. Cl.
CPC ....... *H01M 50/289* (2021.01); *H01M 10/425* (2013.01); *H01M 50/204* (2021.01);
(Continued)

(58) Field of Classification Search
CPC ............. H01M 50/289; H01M 50/262; H01M 50/244; H01M 50/271
See application file for complete search history.

(56) References Cited

U.S. PATENT DOCUMENTS

| 2007/0284167 A1* | 12/2007 | Watanabe | ............... B60L 58/24 180/68.5 |
| 2019/0237814 A1* | 8/2019 | Waters | ................ H01M 50/588 |
| 2020/0161728 A1* | 5/2020 | Wang | ................ H01M 10/6554 |

FOREIGN PATENT DOCUMENTS

| CN | 204792966 U | 11/2015 |
| CN | 205790108 U | 12/2016 |

(Continued)

OTHER PUBLICATIONS

International Search Report dated Jul. 29, 2019 issued in PCT/CN2019/079676.

*Primary Examiner* — Jonathan G Jelsma
(74) *Attorney, Agent, or Firm* — Scully, Scott, Murphy & Presser, P.C.

(57) ABSTRACT

The present application provides a battery box, including a battery and an electronic device electrically connected to the battery. The battery box further includes a lower box body, including a first box part and a second box part, where the second box part is integrally connected to the first box part; a first top cover, hermetically and removably mounted in a height direction above the first box part and forming a sealed first space with the first box part, where the first space accommodates the battery; and a second top cover, hermetically and removably mounted in the height direction above the second box part and forming a sealed second space with the second box part, where the second space accommodates the electronic device electrically connected to the battery, and the second top cover is disposed independent of the first top cover.

7 Claims, 5 Drawing Sheets

(51) Int. Cl.
*H01M 50/204* (2021.01)
*H01M 50/244* (2021.01)
*H01M 50/262* (2021.01)
*H01M 50/271* (2021.01)
*H01M 50/291* (2021.01)

(52) U.S. Cl.
CPC ....... *H01M 50/244* (2021.01); *H01M 50/262* (2021.01); *H01M 50/271* (2021.01); *H01M 50/291* (2021.01)

(56) References Cited

FOREIGN PATENT DOCUMENTS

| | | |
|---|---|---|
| CN | 207201131 U | 4/2018 |
| WO | 2011134815 A1 | 11/2011 |
| WO | 2011134828 A1 | 11/2011 |

* cited by examiner

BATTERY BOX

CROSS-REFERENCE TO RELATED APPLICATIONS

This application is a continuation of International Application No. PCT/CN2019/079676, filed on Mar. 26, 2019, which claims priority to Chinese Patent Application No. 201822224327.3, filed on Dec. 27, 2018, both of which are hereby incorporated by reference in their entireties.

TECHNICAL FIELD

The present application relates to the battery field, and in particular, to a battery box.

BACKGROUND

Nowadays, traction battery packs are typically designed in an integrated manner. A battery or module and an electronic or electrical component are integrated in a box, and the box is sealed. Inside the box is provided an integrated space with no division.

In such a conventional battery pack, a box structure is integrated and simplified, but if high-temperature thermal runaway, especially thermal runaway caused by a failure of the electrical component occurs in either of a cavity accommodating the electrical component and a cavity accommodating the battery, the entire pack will be significantly affected. In addition, when the electrical component is to be repaired or replaced, an entire top cover needs to be dismantled, which easily affects the arrangement of electrical connections and components in the battery cavity and makes it relatively difficult and costly to repair.

SUMMARY

In view of the problems described in the background, an objective of the present application is to provide a battery box, where a second top cover of the battery box is able to be dismantled separately. This facilitates replacement or repair of an electronic device in a second space of the battery box, reducing repair cost and repair difficulty.

To achieve the foregoing objective, the present application provides a battery box, including a battery and an electronic device electrically connected to the battery. The battery box further includes a lower box body, including a first box part and a second box part, where the second box part is integrally connected to the first box part; a first top cover, hermetically and removably mounted in a height direction above the first box part and forming a sealed first space with the first box part, where the first space accommodates the battery; and a second top cover, hermetically and removably mounted in the height direction above the second box part and forming a sealed second space with the second box part, where the second space accommodates the electronic device electrically connected to the battery, and the second top cover is disposed independent of the first top cover.

In an embodiment, the lower box body includes a bottom wall; a first side wall, connected to a periphery of the bottom wall and extending upward; and a first flange, connected to an end of the first side wall and extending to outside of the lower box body.

In an embodiment, the lower box body further includes a separator, mounted between the first box part and the second box part to separate the first box part from the second box part.

In an embodiment, the separator includes a first fastening part, abutting against and fastened to the first flange and extending along the first flange; a separating piece, connected to the first fastening part and bending downwards from the first fastening part, with a bottom end abutting against the bottom wall, to separate the first box part from the second box part of the lower box body; and a second fastening part, connected to an end of the separating piece opposite the first fastening part in the height direction and extending away from the first fastening part, where the second fastening part is fastened to the bottom wall.

In an embodiment, the first top cover includes a first top wall; a second side wall, connected to a periphery of the first top wall and extending to the lower box body; and a second flange, connected to an end of the second side wall and extending to outside of the first top cover, where the second flange of the first top cover is hermetically fastened to the first flange disposed on the first box part of the lower box body and the first fastening part of the separator.

In an embodiment, there are two first fastening parts, where each first fastening part is at least partially abutting against and fastened to the first flange; and the separator further includes a concave portion, disposed between the two first fastening parts and recessed relative to the two first fastening parts along the height direction, where the concave portion is configured for a cable that electrically connects the battery and the electronic device to pass through.

In an embodiment, the battery box further includes a sealing piece, configured to seal a corresponding portion between the concave portion and the second flange of the first top cover after the cable that electrically connects the battery and the electronic device passes through the concave portion.

In an embodiment, the second top cover includes a second top wall; a third side wall, connected to a periphery of the second top wall and extending to the lower box body; and a third flange, connected to an end of the third side wall and extending to outside of the second top cover, where the third flange of the second top cover is hermetically fastened to the first flange disposed on the second box part of the lower box body.

In an embodiment, the lower box body further includes a longitudinal beam, disposed in the first space and extending along the entire first space in a longitudinal direction; and traverse beams, disposed on two sides of the longitudinal beam in a transverse direction, where, in the transverse direction, one end of each traverse beam is hermetically connected to the longitudinal beam and the other end is hermetically connected to the first side wall and the second side wall, and in the height direction, two sides of each traverse beam are hermetically connected to the first top wall of the first top cover and the bottom wall of the lower box body, respectively; where the traverse beams and the longitudinal beam are cross arranged to split the first space into a plurality of subspaces, and the battery is accommodated in each subspace.

In an embodiment, a height of the longitudinal beam is smaller than a height of the traverse beams, so that the cable that electrically connects the battery and the electronic device is arranged along a top surface of the longitudinal beam.

Beneficial effects of the present application are as follows: In the battery box according to the present application, the second top cover is disposed independent of the first top cover, so that only the second top cover needs to be dismantled separately when repairing or replacing the electronic device in the second space. This does not affect a sealed state of the first space that accommodates the battery, and reduces repair cost and repair difficulty of the battery box. In addition, the first space is isolated from the second space to prevent spreading of thermal runaway caused by diffusion of heat to the first space when thermal runaway occurs on the electronic device, improving safety performance of the battery box.

Figure 1:
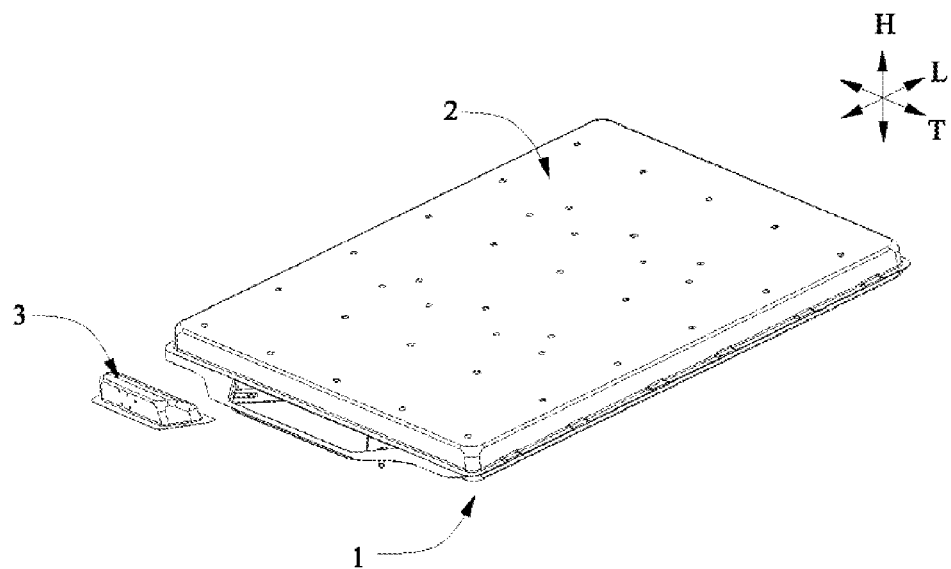
FIG. 1 is a three-dimensional diagram of a battery box according to the present application, where a second top cover is not mounted in a lower box body and an electronic device in a second space is omitted.

Reference signs are described as follows:

1. lower box body;
    11. bottom wall;
    12. first side wall;
    13. first flange;
    B1. first box part;
    B2. second box part;
2. first top cover
    21. first top wall;
    22. second side wall;
    23. second flange;
3. second top cover
    31. second top wall;
    32. third side wall;
    33. third flange;
4. separator;
    41. first fastening part;
    42. separating piece;
    43. concave portion;
    44. second fastening part;
5. traverse beam;
    51. through hole;
6. longitudinal beam;
7. battery;
8. electronic device;
9. cable;
T. transverse direction;
L. longitudinal direction; and
H. height direction.

DESCRIPTION OF EMBODIMENTS

The accompanying drawings show embodiments of the present application. It should be understood that the disclosed embodiments are merely examples of the present application. The present application may be implemented in various forms. Therefore, specific details disclosed herein should not be interpreted as any limitation, and shall be used merely as a basis for the claims and serve as an illustrative basis to instruct persons skilled in the art to implement the present application in various manners.

In addition, expressions such as a longitudinal direction, a height direction, and a transverse direction that are used to describe indication directions of operations and constructions of various members of the battery box in the embodiments are relative rather than absolute. Although these indications are appropriate when the members of the battery box are located at the positions shown in the drawings, these directions shall be interpreted differently when the positions change, to reflect the changes.

Figure 2:
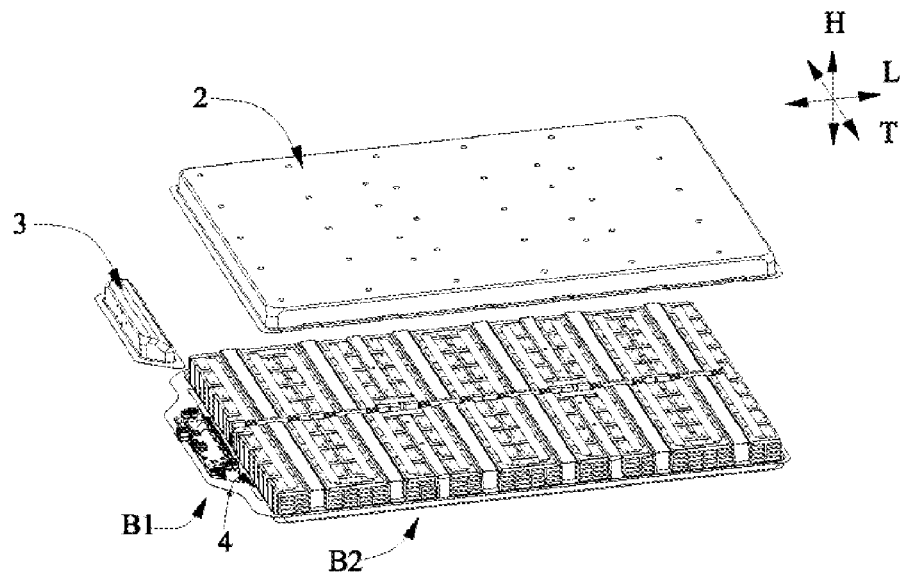
FIG. 2 is an exploded view of a battery box according to the present application.
Figure 3:
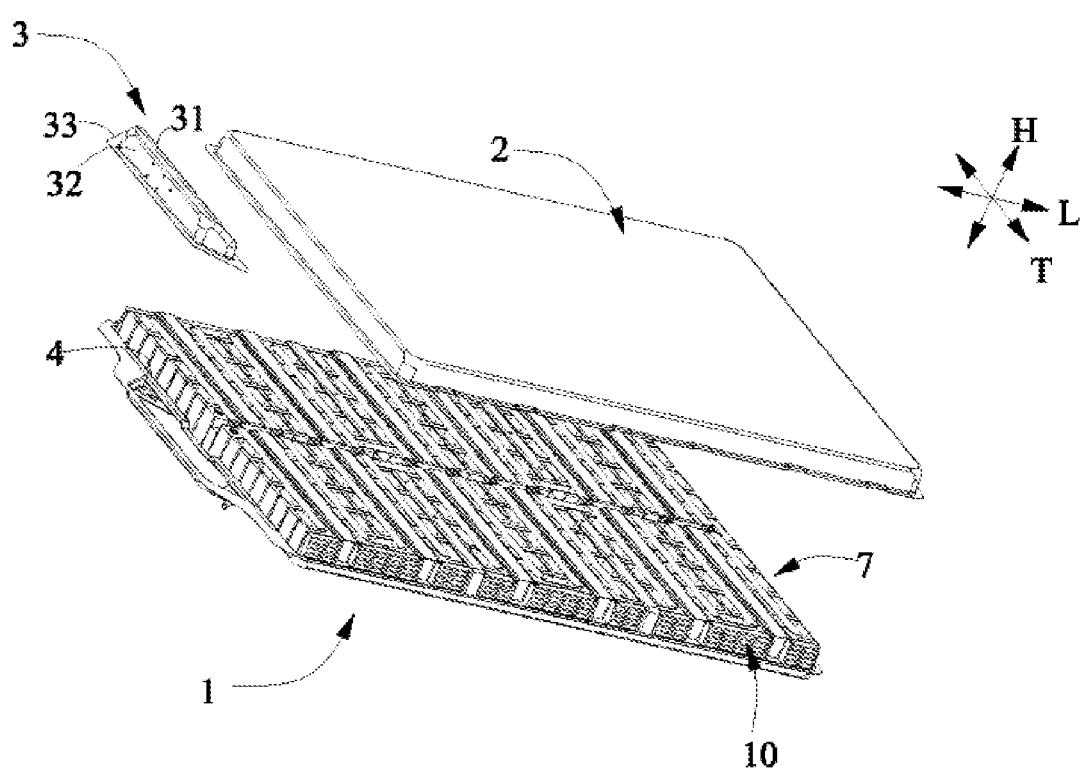
FIG. 3 is a three-dimensional diagram of FIG. 2 from another perspective, where an electronic device in a second space is omitted.

FIG. 1 is a three-dimensional diagram of a battery box according to the present application, where a second top cover is not mounted in a lower box body and an electronic device in a second space is omitted. FIG. 2 is an exploded view of a battery box according to the present application. FIG. 3 is a three-dimensional diagram of FIG. 2 from another perspective, where an electronic device in a second space is omitted.

The battery box includes a lower box body 1, a first top cover 2, a second top cover 3, a separator 4, a battery 7, and an electronic device 8.

The lower box body 1 includes a first box part B1 and a second box part B2, where the second box part B2 is integrally connected to the first box part B1. The first top cover 2 is hermetically and removably mounted in a height direction H above the first box part B1 and forms a sealed first space with the first box part B1, where the first space accommodates the battery 7. The second top cover 3 is hermetically and removably mounted in the height direction H above the second box part B2 and forms a sealed second space with the second box part B2, where the second space accommodates the electronic device 8 electrically connected to the battery 7, and the second top cover 3 is disposed independent of the first top cover 2. The electronic device 8 may be an electronic component commonly used in a battery box, such as a circuit board, a fuse, a relay, a temperature sensor, a voltage sensor, a current sensor, a high-voltage component, and a low-voltage component. A first space and a second space that are mutually independent and separately sealed are formed in the battery box. The battery 7 is accommodated in the sealed first space, and the electronic device 8 is accommodated in the sealed second space, so that the first space and the second space do not affect each other. Therefore, when the electronic device 8 in the second space needs to be repaired or replaced due to damage, an operator only needs to separately dismantle the second top cover 3. This reduces repair cost and repair difficulty. In addition, during dismantling of the second top cover 3, the first space remains sealed, free of external influences. Consequently, components such as the battery 7 and electrical connections in the first space are not affected. Furthermore, the first space and the second space are separately sealed. Therefore, the first space and the second space have different sealing levels and can be sealed separately according to specific sealing requirements to ensure different sealing levels. In addition, when thermal runaway occurs on the electronic device 8 in the second space, heat will not be spread to the first space because the first space is isolated from the second space. This prevents heat from spreading and avoids impacts on components such as the battery in the first space, improving safety of the battery box. In addition, a flame and fire retardant material may be further provided in the first space, so that when thermal runaway occurs, the flame and fire retardant material is able to quickly absorb heat and stop burning, helping prevent the heat from spreading.

The separator 4 is mounted between the first box part B1 and the second box part B2 to separate the first box part B1 from the second box part B2. The separator 4 may alternatively be fastened between the first box part B1 and the second box part B2 through welding or bonding.

Figure 6:
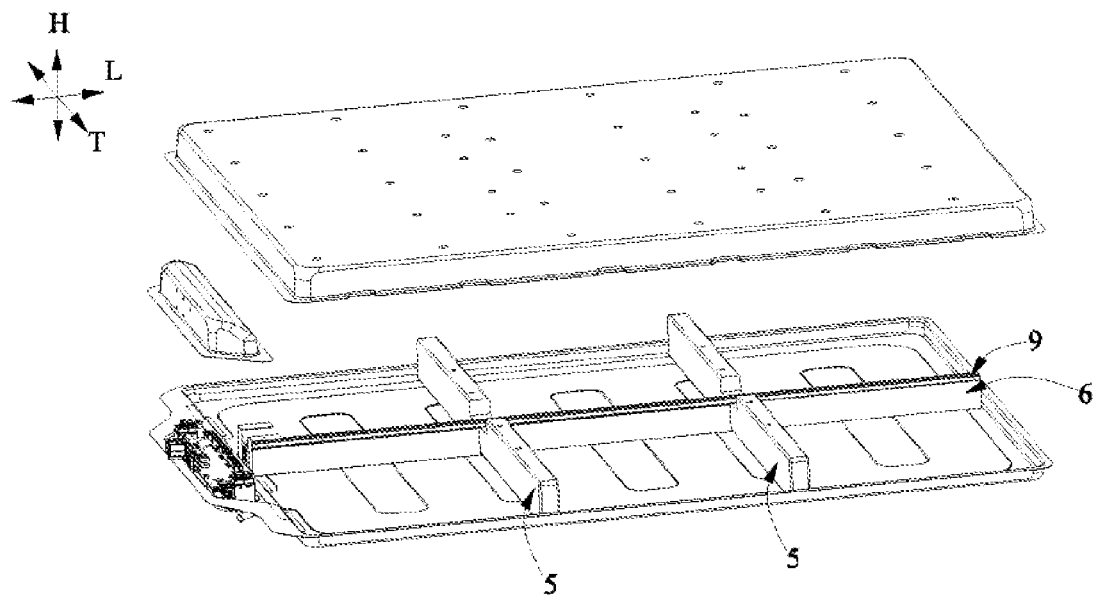
FIG. 6 is a three-dimensional diagram of a battery box that is similar to FIG. 2, where batteries and other electrical connectors are removed.
Figure 7:
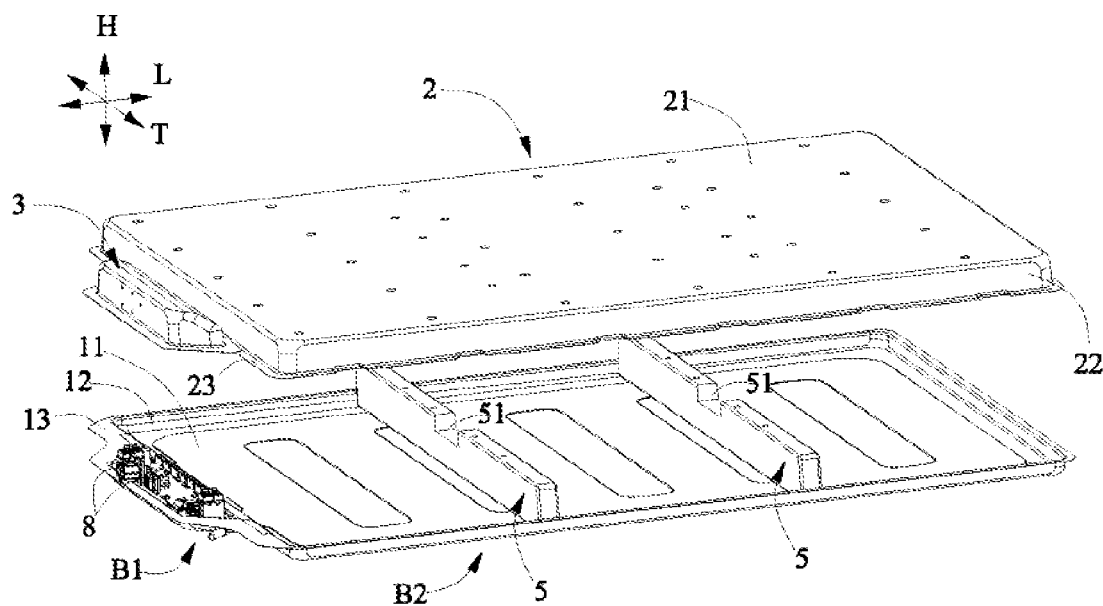
FIG. 7 is a three-dimensional diagram of another embodiment that is similar to FIG. 6.

FIG. 6 is a three-dimensional diagram of a battery box that is similar to FIG. 2, where batteries and other electrical connectors are removed. FIG. 7 is a three-dimensional diagram of another embodiment that is similar to FIG. 6.

The battery box may further include traverse beams 5, a longitudinal beam 6, a cable 9, and a sealing piece (not shown).

The longitudinal beam 6 is disposed in the first space and extends along the entire first space in a longitudinal direction L. The traverse beams 5 are disposed on two sides of the longitudinal beam 6 in a transverse direction T. The traverse beams 5 and the longitudinal beam 6 are cross arranged to split the first space into a plurality of subspaces, and the battery 7 is accommodated in each subspace. A height of the longitudinal beam 6 is smaller than a height of the traverse beams 5, so that the cable 9 that electrically connects the battery 7 and the electronic device 8 is arranged along a top surface of the longitudinal beam 6. The arrangement of the longitudinal beam 6 and the traverse beams 5 is able to increase an overall strength of the lower box body 1. When the battery box experiences collision or squeezing, the longitudinal beam 6 and the traverse beams 5 are able to provide sufficient protection to prevent the battery box from being squeezed and deformed, improving reliability of the battery box. In addition, the cable 9 used for electrical connection is disposed in the first space. The design in which the height of the longitudinal beam 6 is smaller than the height of the traverse beams 5 provides a space for arranging the cable 9, so that the cable 9 can be arranged along a top surface of the longitudinal beam 6. This wiring form makes the wiring neat and convenient, provides clear routing and reduces the wiring length, and also makes effective use of the space.

The lower box body 1 includes a bottom wall 11; a first side wall 12, connected to a periphery of the bottom wall 11 and extending upward; and a first flange 13, connected to an end of the first side wall 12 and extending to outside of the lower box body 1.

The first top cover 2 includes a first top wall 21; a second side wall 22, connected to a periphery of the first top wall 21 and extending to the lower box body 1; and a second flange 23, connected to an end of the second side wall 22 and extending to outside of the first top cover 2.

The second top cover 3 includes a second top wall 31; a third side wall 32, connected to a periphery of the second top wall 31 and extending to the lower box body 1; and a third flange 33, connected to an end of the third side wall 32 and extending to outside of the second top cover 3, where the third flange 33 of the second top cover 3 is hermetically fastened to the first flange 13 disposed on the second box part B2 of the lower box body 1. The third flange 33 can be hermetically fastened to the first flange 13 of the second box part B2 through bonding. Certainly, other sealing manners (such as by using a sealing strip) may also be used for the connection.

In the lower box body 1, the traverse beams 5 and the longitudinal beam 6 split the first space into a plurality of sealed subspaces. Specifically, the traverse beams 5 are disposed on two sides of the longitudinal beam 6 in the transverse direction T. One end of each traverse beam 5 in the transverse direction T is hermetically connected to the longitudinal beam 6 and the other end is hermetically connected to the first side wall 12 and the second side wall 22. Two sides of each traverse beam 5 in the height direction H are hermetically connected to the first top wall 21 of the first top cover 2 and the bottom wall 11 of the lower box body 1, respectively. The cable 9 on the top surface of the longitudinal beam 6 also needs to maintain the sealed connection to the first top wall 21 after being laid, so as to ensure a sealed state of each subspace. The sealed connection may be implemented by using sealing strips or binders. It should be noted that the plurality of sealed subspaces may be alternatively split in other manners. For example, as shown in FIG. 7, the first space can be split into a plurality of sealed subspaces along the longitudinal direction L merely by arranging the traverse beams 5. In this embodiment, the two sides of each traverse beam 5 in the height direction H are hermetically connected to the first top wall 21 of the first top cover 2 and the bottom wall 11 of the lower box body 1, respectively, and the two sides of each traverse beam 5 in the transverse direction T are hermetically connected to the first side wall 12 of the lower box body 1 and the second side wall 22 of the first top cover 2, respectively. A through hole 51 that is configured for the cable 9 to pass through is provided in the center of the traverse beam 5. After the cable that electrically connects batteries 7 accommodated in two adjacent subspaces passes through the through hole 51, the sealing piece (not shown) is configured to keep the two adjacent subspaces sealed. Certainly, the first space can alternatively be split into a plurality of sealed subspaces along the transverse direction T merely by arranging the longitudinal beam 6. A specific splitting form may be selected based on a specific case. Preferably, to improve an overall strength of the battery box, the traverse beams 5 and longitudinal beam 6 in the first case are used for splitting. The first space is split into a plurality of sealed subspaces by the traverse beams 5 and/or the longitudinal beam 6. If thermal runaway occurs on the battery 7 in one of the subspaces, heat will not be spread to other subspaces to cause damages to batteries in the other subspaces. This prevents thermal runaway from spreading and improves overall performance of the battery box.

Figure 4:
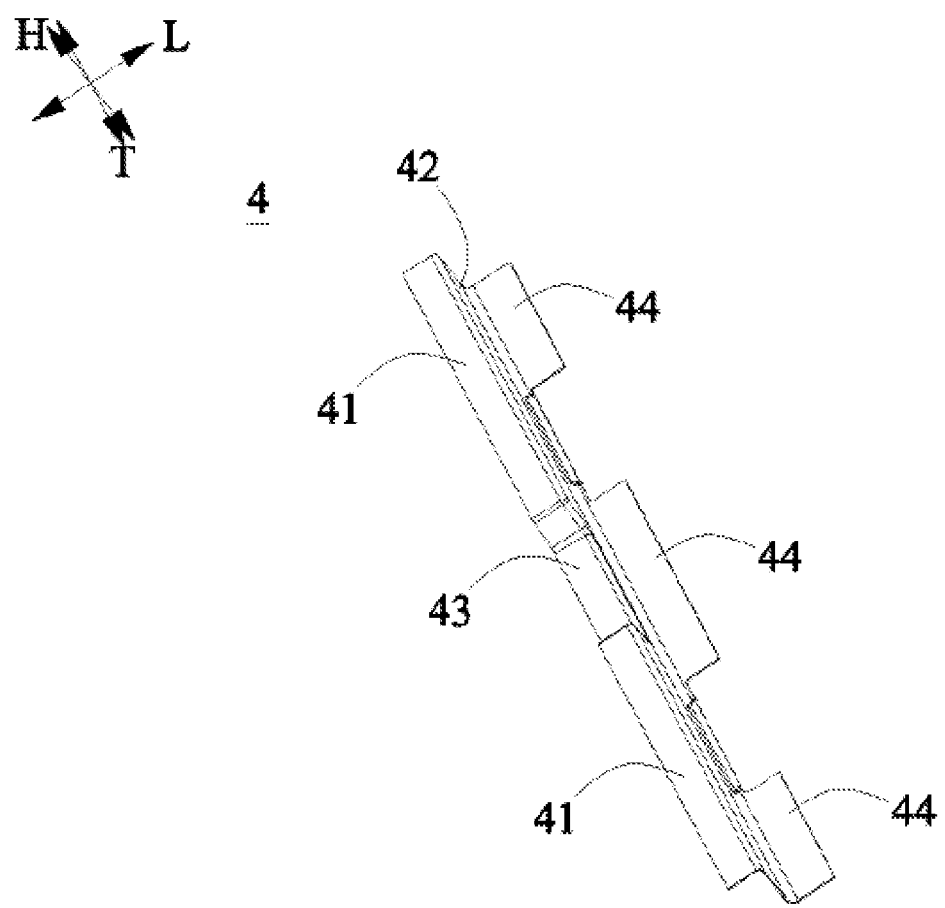
FIG. 4 is a three-dimensional diagram of a separator in FIG. 3.
Figure 5:
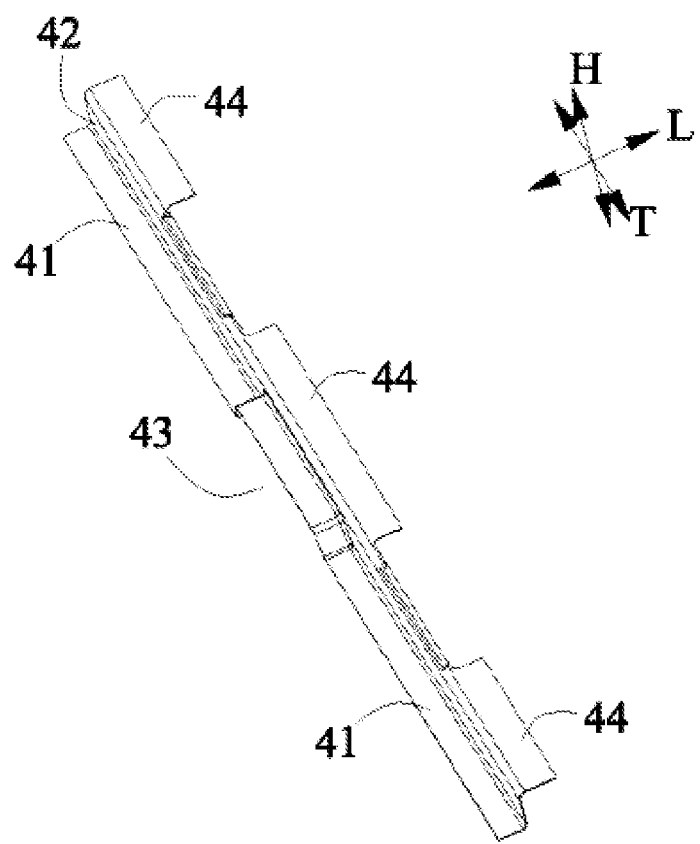
FIG. 5 is a view of FIG. 4 from another perspective.

FIG. 4 is a three-dimensional diagram of a separator in FIG. 3. FIG. 5 is a view of FIG. 4 from another perspective.

The separator 4 includes a first fastening part 41, abutting against and fastened to the first flange 13 and extending along the first flange 13; a separating piece 42, connected to the first fastening part 41 and bending downwards from the first fastening part 41, with a bottom end abutting against the bottom wall 11, to separate the first box part B1 from the second box part B2 of the lower box body 1; and a second fastening part 44, connected to an end of the separating piece 42 opposite the first fastening part 41 in the height direction H and extending away from the first fastening part 41, where the second fastening part 44 is fastened to the bottom wall 11. The second flange 23 of the first top cover 2 is hermetically fastened to the first flange 13 disposed on the first box part B1 of the lower box body 1 and the first fastening part 41 of the separator 4. The design of the separator 4 spatially separates the first box part B1 from the second box part B2, which ensures that the first space and the second space can be isolated from each other after the battery box is assembled. In addition, the lower box body 1 is an integrally formed structure and the lower box body 1 is made of a relatively thin plate. If punching is performed to form the first box part B1 and the second box part B2 that are mutually isolated, the first box part B1 and the second box part B2 may have low strengths and be prone to damages. The first box part B1 and the second box part B2 herein are spatially connected, ensuring an overall strength of the lower box body 1. Use of the separate separator 4 simplifies the separation. In addition, the separator 4 can be formed through punching and bending, making manufacturing easy and mounting convenient. The second fastening part 44 is fastened to the bottom wall 11, which ensures stability of the separator 4 and prevents sealing of the first space and the second space from being affected by displacement of the separator 4 when the battery box experiences collision. The second fastening part 44 may be fastened to the bottom wall 11 through welding or bonding.

There are two first fastening parts 41, where each first fastening part 41 is at least partially abutting against and fastened to the first flange 13. The separator 4 further includes a concave portion 43, disposed between the two first fastening parts 41 and recessed relative to the two first fastening parts 41 along the height direction H, where the concave portion 43 is configured for the cable 9 that electrically connects the battery 7 and the electronic device 8 to pass through. The first fastening part 41 can be hermetically connected to the second flange 23 of the first top cover, to form the sealed first space.

The battery box further includes a sealing piece, configured to seal a corresponding portion between the concave portion 43 and the second flange 23 of the first top cover 2 after the cable 9 that electrically connects the battery 7 and the electronic device 8 passes through the concave portion 43. The concave portion 43 is provided to separate the first space and the second space from each other, ensuring that both remain sealed and do not affect each other. The sealing piece may be a seal ring.

The foregoing detailed descriptions describe a plurality of example embodiments. However, this specification is not intended to limit the application to these explicitly disclosed combinations. Therefore, unless otherwise stated, various features disclosed herein may be combined together to form a plurality of other combinations that are not shown for simplicity purposes.

What is claimed is:

1. A battery box, comprising a battery and an electronic device electrically connected to the battery, wherein the battery box further comprises:
    a lower box body, comprising a first box part and a second box part, wherein the second box part is integrally connected to the first box part;
    a first top cover, hermetically and removably mounted in a height direction above the first box part and forming a sealed first space with the first box part, wherein the first space accommodates the battery; and
    a second top cover, hermetically and removably mounted in the height direction above the second box part and forming a sealed second space with the second box part, wherein the second space accommodates the electronic device electrically connected to the battery, and the second top cover is disposed independent of the first top cover;
    wherein the lower box body comprises a bottom wall; a first side wall, connected to a periphery of the bottom wall and extending upward; and a first flange, connected to an end of the first side wall and extending to outside of the lower box body;
    the lower box body further comprises a separator, mounted between the first box part and the second box part to separate the first box part from the second box part; and
    the separator comprises a first fastening part, abutting against and fastened to the first flange and extending along the first flange; a separating piece, connected to the first fastening part and bending downwards from the first fastening part, with a bottom end abutting against the bottom wall, to separate the first box part from the second box part of the lower box body; and a second fastening part, connected to an end of the separating piece opposite the first fastening part and extending away from the first fastening part, in the height direction, wherein the second fastening part is fastened to the bottom wall.

2. The battery box according to claim 1, wherein the first top cover comprises a first top wall; a second side wall, connected to a periphery of the first top wall and extending to the lower box body; and a second flange, connected to an end of the second side wall and extending to outside of the first top cover, wherein the second flange of the first top cover is hermetically fastened to the first flange disposed on the first box part of the lower box body and the first fastening part of the separator.

3. The battery box according to claim 2, wherein
    there are two first fastening parts, wherein each first fastening part is at least partially abutting against and fastened to the first flange; and
    the separator further comprises a concave portion, disposed between the two first fastening parts and recessed relative to the two first fastening parts along the height direction, wherein the concave portion is configured for a cable that electrically connects the battery and the electronic device to pass through.

4. The battery box according to claim 3, wherein the battery box further comprises a sealing piece, configured to seal a corresponding portion between the concave portion and the second flange of the first top cover after the cable that electrically connects the battery and the electronic device passes through the concave portion.

5. The battery box according to claim 2, wherein the lower box body further comprises a longitudinal beam, disposed in the first space and extending along the entire first space in a longitudinal direction; and traverse beams, disposed on two sides of the longitudinal beam in a transverse direction, wherein, in the transverse direction, one end of each traverse beam is hermetically connected to the longitudinal beam and the other end is hermetically connected to the first side wall and the second side wall, and in the height direction, two sides of each traverse beam are hermetically connected to the first top wall of the first top cover and the bottom wall of the lower box body, respectively; wherein the traverse beams and the longitudinal beam are cross arranged to split the first space into a plurality of subspaces, and the battery is accommodated in each subspace.

6. The battery box according to claim 5, wherein
    a height of the longitudinal beam is smaller than a height of the traverse beams, so that a cable that electrically connects the battery and the electronic device is arranged along a top surface of the longitudinal beam.

7. The battery box according to claim 1, wherein the second top cover comprises a second top wall; a third side wall, connected to a periphery of the second top wall and extending to the lower box body; and a third flange, connected to an end of the third side wall and extending to outside of the second top cover, wherein the third flange of the second top cover is hermetically fastened to the first flange disposed on the second box part of the lower box body.

* * * * *